Patented Aug. 7, 1928.

1,679,752

UNITED STATES PATENT OFFICE.

ARTHUR P. TANBERG AND RICHARD L. KRAMER, OF WILMINGTON, DELAWARE, ASSIGNORS TO E. I. DU PONT DE NEMOURS & COMPANY, OF WILMINGTON, DELAWARE, A CORPORATION OF DELAWARE.

FINELY-DIVIDED NITROGUANIDINE AND METHOD OF MAKING SAME.

No Drawing. Application filed April 6, 1922. Serial No. 550,178.

This invention relates to nitroguanidine in a new physical form, and to a method of imparting this form to nitroguanidine.

The object of our invention is to provide a safe, simple and economical method for the production of pure nitroguanidine in unusually finely divided form, particularly for incorporation into multi-perforated nitrocellulose propellant powders such as those described in the co-pending application of J. M. Skilling Serial No. 535,315 filed February 9, 1922. Since nitroguanidine is insoluble in the nitrocellulose solvent used in connection with the manufacture of these powders, it is desirable not only that the nitroguanidine be as finely divided as possible but also that the particles be as uniform as possible in size.

All practical methods known at the present time for the production of nitroguanidine involve the intermediate preparation of a salt of guanidine. Marqueyrol & Loriette (French Patent 503,741) prepare (from dicyandiamide) a sulphuric acid solution of guanidine, and treat this solution directly with mixed nitric and sulphuric acids. D. R. P. 222,552 (to Stickstoffwerke G. M. B. H. im Spandau) and Werner & Bell (J. C. S. 1920, page 1133) describe a method by which a guanidine salt can be prepared by fusion of dicyandiamide with the corresponding ammonium salt. Ewan & Young (J. S. C. I. 40, 109–T) describe in considerable detail a method for the production of nitroguanidine which involves the preparation of guanidine nitrate by fusion of dicyandiamide with ammonium nitrate, and subsequent conversion of guanidine nitrate into nitroguanidine by treatment with concentrated sulphuric acid. In order to precipitate the nitroguanidine it is customary to drown the nitroguanidine-acid mixture in water, in which nitroguanidine is very slightly soluble at ordinary temperatures. This drowning treatment gives the nitroguanidine in quite finely divided form.

The treatment of guanidine nitrate with sulphuric acid, followed by drowning, is well known. A study of the mechanism of this treatment with sulphuric acid has shown us, however, that it involves, not merely a simple dehydration, but rather a preliminary reaction of the guanidine nitrate with sulphuric acid to give a mixture of guanidine (or guanidine sulphate), nitric acid, and sulphuric acid, followed by nitration of the guanidine. Although this conversion of guanidine nitrate to nitroguanidine can be represented by an equation which involves simply the removal of one molecule of water from guanidine nitrate, we have found it impossible to replace sulphuric acid by any compound which functions simply as a dehydrating agent. In other words, we have not found it possible to prepare nitroguanidine by any practical method which does not involve, in the final stage, contact of the nitroguanidine with sulphuric acid. We have found moreover that crude nitroguanidine obtained by drowning in water a mixture of nitroguanidine, sulphuric acid, etc., is always contaminated with impurities, the most serious of which is a small but definite percentage of sulphuric acid; and that this small quantity of sulphuric acid can be readily and completely removed only by recrystallization of the crude nitroguanidine from water. With these facts established we were confronted with the following difficulties from the standpoint of producing nitroguanidine satisfactory for the manufacture of multi-perforated powders:

1. "Crude" nitroguanidine prepared by the usual methods, involving drowning a sulphuric acid solution in water, is finely divided but contains a small amount of sulphuric acid, together with other impurities of minor importance. While it seems unlikely that this sulphuric acid is present as free acid, it is known that it is not very firmly held and that it is therefore a very undesirable impurity in nitroguanidine to be used for the manufacture of a propellant powder.

2. Sulphuric acid (and other impurities) can be removed by recrystallization of the nitroguanidine from hot water. This recrystallization, however, gives crystals which are entirely too large for incorporation into powder. The size of these crystals constitutes a serious difficulty since, on account of nitroguanidine being an explosive of high order of detonation, it is very dangerous to grind them by any ordinary method. Moreover the physical characteristics of the crystals are such that they are difficult to grind, and to convert them to even as finely divided a form as we obtained by precipitation from sulphuric acid is practically impossible. Even if grinding nitroguanidine were safe, simple and cheap, the ground material would have to be carefully screened in order to remove the appreciable portion of larger crystals which would always be present.

Nitroguanidine is an unusual substance from the standpoint of its solubility. Strong mineral acids have a small solvent action; for example, 33.2% sulphuric acid dissolves 2.55 g. of nitroguanidine per 100 g. of acid, and stronger sulphuric acid has a somewhat greater solvent power. 1000 parts of water dissolve approximately 1.0 part of nitroguanidine at 0° C. At 100° C. about 11 parts of water are required to dissolve 1 part of nitroguanidine (Thiele, Liebig's Annalen, 270, 16). Less than 2.0 grams of nitroguanidine dissolves in 1000 parts of the following solvents at 100° C. or at the boiling point of the solvent if the boiling point is less than 100° C.; methyl alcohol, ethyl alcohol, isopropyl alcohol, butyl alcohol, glycerine, triacetin, ethyl acetate, phenol, aniline, methyl acetone, equal parts of acetanilid and ethyl alcohol, dipentene, turpentine chloroform, butyl bromide, dinitrotoluene, acetone, ether, cottonseed oil, carbon disulphide, petroleum ether, urea (M. P. 132–133° C.) and a mixture of equal parts of ethyl alcohol, acetone, and dimethyldiphenylurea (M. P. 121° C.).

The low solubility of nitroguanidine in a wide variety of solvents, as set forth above, indicates, if anything, the impracticability of methods involving precipitation of nitroguanidine from its solution for the purpose of preparing it in finely divided form, especially where it is essential, that the finely divided nitroguanidine be free from acid impurities.

Our invention is based upon the discovery that there occurs a remarkable increase in the solubility of nitroguanidine in water at temperatures above 100° C., and particularly through the range of temperatures from about 120° C. to 160° C. One thousand (1000) parts of water at 100° C. dissolve only 90.9 parts of nitroguanidine, but at 146° C. they dissolve 600 parts, and at 158° C.—965 parts, of nitroguanidine. Other solubility values in 1000 parts of water are: 180 parts of nitroguanidine dissolved at 117° C.; 290 parts, at 130° C.; and 455 parts, at 140° C.

Applying this discovery to the problem of producing finely divided nitroguanidine in a pure condition, we have found that by discharging a saturated water solution of nitroguanidine, obtainable at a temperature substantially above 100° C., into a cold liquid, such as ice-cold water, there is formed pure nitroguanidine in a degree of sub-division far greater than that heretofore obtained by crystallization.

Our new procedure may be illustrated in greater detail by the following example:

Pure recrystallized (but not necessarily dry) nitroguanidine is put in an autoclave, or in any vessel capable of withstanding approximately moderate pressures, with an approximately equal weight of water. The autoclave is then closed, the contents heated by any suitable means to a temperature of approximately 155–160° C., and then discharged by its own pressure into a mixture of ice and water containing a sufficient amount of ice so that the superheated solution will be cooled to 0° C. practically instantaneously. The resulting milk-like suspension can be easily filtered and the wet nitroguanidine thus obtained can be readily dried. The resulting cake of loosely adhering particles can be easily crushed between the fingers.

The nitroguanidine particles obtained by this new method are of even smaller dimensions than those obtained by the precipitation from sulphuric acid referred to above. A microscopic study of the products prepared in several different ways shows clearly the superiority of nitroguanidine prepared by our method for incorporation into propellant powders. Taking as a unit of measurement 0.001 mm. (mu) the following comparative values were determined:—

(1) Material obtained by drowning a sulphuric acid solution of nitroguanidine in water contained particles varying in diameter from 1.3 to 11, in length from 8 to 188, the particles present in greatest abundance measuring approximately 5 in diameter and 80 in length.

(2) Material dissolved in boiling water and allowed to crystallize out by cooling contained particles varying in diameter from 2.7 to 116, and in length from 75 up to about 4000, the particles present in greatest abundance measuring approximately 16 in diameter and 430 in length.

(3) Material recrystallized from water, dried, and ground for a long time contained particles varying in diameter from 2.7 to 27, and in length from 5.4 to 135, the particles present in greatest abundance measuring approximately 7 in diameter and 55 in length.

(4) Material dissolved in water under pressure, at about 150° C., and precipitated by cooling the solution suddenly to about 0° C. (in accordance with the procedure described above), contained particles varying in diameter from 0.9 to 4, and in length from 4 to 65, the crystals present in greatest abundance measuring approximately 3 in diameter and 20 in length.

Of the four varieties mentioned, that obtained by suddenly cooling a superheated water solution was found to be in by far the most finely divided state of subdivision, and to present the smallest variation between the smallest and largest particles. The particles present in material precipitated from sulphuric acid solutions are not only very much larger on the average, but vary much more greatly from the minimum to the maximum size. If the volumes of the particles occurring in greatest abundance be calculated from the figures given above, it will be seen that the particles obtained by precipitation from sulphuric acid are over ten times as large as those obtained by sudden cooling of a superheated water solution.

The advantages of the new method are in brief:

1. It is cheap, safe and simple.
2. It gives a product free from impurities, especially sulphuric acid.
3. It gives a product much more finely divided than can be obtained practically by any other known method.

While the above example specifies a temperature of 155–160° C. it is obvious that the temperature used may be varied widely by varying the proportions of nitroguanidine and water. In general, it is desirable to use a temperature substantially above 100° C. so as to form a solution containing substantially more nitroguanidine than is present in a saturated solution at 100° C., to avoid the use of an unusually large proportion of water, and so that the pressure developed will be sufficient to discharge the solution rapidly into the mixture of ice and water when the discharge valve is opened. External pressure may, of course, be used to discharge the solution, but this involves additional connections, and is unnecessary. On the other hand the use of very high temperatures—that is, substantially above 160° C.— is undesirable for two principal reasons: first, if very high temperatures are used a stronger and therefore more expensive dissolving tank is required; second, at these elevated temperatures nitroguanidine is hydrolyzed by water to ammonia, carbon dioxide and nitrous oxide. After this hydrolysis starts it proceeds with rapidly accelerated velocity, so that the higher the temperature used the shorter must be the time for which the mixture is subjected to this temperature, if undue hydrolysis is to be avoided. Practical considerations therefore point to temperatures between 130 and 160° C. as the best. In practice, working with fairly large quantites of nitroguanidine, we have preferred to use temperatures between 140 and 150° C. At these temperatures the hydrolysis which occurs in the time required to heat up the contents of the dissolving tank and discharge them into the mixture of ice and water is negligible.

The described procedure is given as an example, but it will be understood that it is susceptible of many variations. Instead of charging an autoclave with a mixture of nitroguanidine and water, the water can be introduced in the form of high pressure steam. The nitroguanidine and the steam may be fed into the pressure vessel simultaneously and the resulting solution continuously discharged so as to make the process continuous. Lower or higher temperatures may be employed with correspondingly changed proportions of nitroguanidine and water or steam. Instead of discharging into a mixture of ice and water, some other means of rapid cooling may be employed such, for example, as discharging the superheated solution through a spray nozzle into a chamber or tower through which is passed heated air to remove the water vapor, or into any liquid or gaseous medium which can be maintained at a sufficiently low temperature, and which will not introduce undesirable or difficultly removable impurities into the nitroguanidine.

It will be obvious that, although the above example specifies pure recrystallized nitroguanidine, the process can be applied to nitroguanidine of any degree of purity, dependent upon the degree of purity desired in the final product. If it is applied to an impure nitroguanidine, water soluble impurities will be removed to a certain extent, and insoluble impurities can be removed by causing the solution to pass through a screen or filter as it is being discharged.

In its broader aspect our invention, as it relates to a method, is not limited to nitroguanidine, but includes the treatment, in the above described manner, of other organic compounds, such as para-nitranilin, which, although but slightly soluble in water at temperatures of, say, about 0° C., are readily soluble at temperatures above 100° C. but at the same time below the point of rapid decomposition of the organic compound. Furthermore, in this broader aspect, our invention includes the use of liquid mediums other than water where the solubility of the nitroguanidine or other compound increases from a very low value at low temperatures to a high value at high temperatures without undergoing rapid decomposition at these high temperatures.

We claim:

1. The method of preparing finely divided nitroguanidine which comprises dissolving sufficient nitroguanidine in water at a temperature substantially above 100° C., under super-atmospheric pressure, to form a solution containing substantially more nitroguanidine than would saturate said water at 100° C., and then discharging said solution into a cold liquid medium to precipitate the nitroguanidine in a finely subdivided state.

2. The method of preparing finely divided nitroguanidine which comprises dissolving sufficient nitroguanidine in water at a temperature between 120 and 160° C., under super-atmospheric pressure, to form a saturated solution at a temperature above 120° C., and then discharging said solution into a cold liquid medium to precipitate the nitroguanidine in a finely subdivided state.

3. The method of preparing finely divided nitroguanidine which comprises dissolving sufficient nitroguanidine in water at a temperature substantially above 100° C., under super-atmospheric pressure, to form a solution containing substantially more nitroguanidine than would saturate said water at 100° C., and then discharging said solution into cold water.

4. The method of preparing finely divided nitroguanidine which comprises dissolving sufficient nitroguanidine in water at a temperature between 120 and 160° C., under super-atmospheric pressure, to form a saturated solution at a temperature above 120° C., and then discharging said solution into cold water.

5. The method of preparing finely divided nitroguanidine which comprises heating, under pressure, from about 3 to 10 parts of sulfuric acid-free nitroguanidine with 10 parts of water at a temperature, between 130 and 160° C., sufficient to effect solution of said nitroguanidine, and then discharging the resulting solution into cold water.

6. The method of preparing finely divided nitroguanidine free from sulfuric acid which comprises heating, under pressure, from about 4.5 to 7 parts of sulfuric acid-free nitroguanidine with 10 parts of water to a temperature, between about 140 and 150° C., at which all of the nitroguanidine will dissolve, and then suddenly discharging the resulting solution into water at a temperature of about 0° C. containing a sufficient amount of ice so that the hot discharged solution will be cooled to about 0° C. almost instantaneously.

7. In the method of preparing finely divided nitroguanidine, the step which comprises heating from about 2 to 10 parts of nitroguanidine mixed with 10 parts of water at a temperature, between about 120 and 160° C., at which all of the nitroguanidine will dissolve.

8. In the method of preparing finely divided nitroguanidine, the step which comprises heating from about 4.5 to 7 parts of nitroguanidine mixed with 10 parts of water at a temperature, between about 140 and 150° C., at which all of the nitroguanidine will dissolve.

9. Nitroguanidine in such a finely divided form as to be suitable for incorporation in multi-perforated nitrocellulose powders, and obtainable by discharging a solution composed of from 2 to 10 parts of nitroguanidine dissolved in 10 parts of water at a temperature above 100° C. into a mixture of ice and water containing a sufficient amount of ice so that the hot discharged solution will be cooled to about 0° C. almost instantaneously, and then filtering and drying the precipitated nitroguanidine, said finely divided nitroguanidine being free from sulfuric acid.

10. As a new product suitable for incorporation in multi-perforated nitrocellulose powders, finely divided nitroguanidine free from sulfuric acid, the particles present in greatest abundance measuring less than 5 mu in diameter and 80 mu in length.

11. As a new product suitable for incorporation in multi-perforated nitrocellulose powders, finely divided nitroguanidine free from sulfuric acid, the particles present varying in diameter from 0.9 to 4 mu, and in length from 4 to 65 mu, the crystals present in greatest abundance measuring approximately 3 mu in diameter and 20 mu in length.

12. As a new composition of matter a solution of nitroguanidine comprising more than 2 parts of nitroguanidine dissolved in 10 parts of water.

13. As a new composition of matter a solution of nitroguanidine comprising more than 2 parts of nitroguanidine dissolved in 10 parts of water, said solution being substantially free from sulfuric acid.

14. As a new composition of matter a solution comprising from about 3 to 10 parts of nitroguanidine dissolved in 10 parts of water.

15. As a new composition of matter a solution comprising from about 3 to 10 parts of nitroguanidine dissolved in 10 parts of water, said solution being substantially free from sulfuric acid.

In testimony whereof we affix our signatures.

ARTHUR P. TANBERG.
RICHARD L. KRAMER.